March 10, 1925.
T. FORD ET AL
1,529,475
ILLUMINATING MEANS FOR LIQUID LEVELS
Filed Feb. 7, 1924
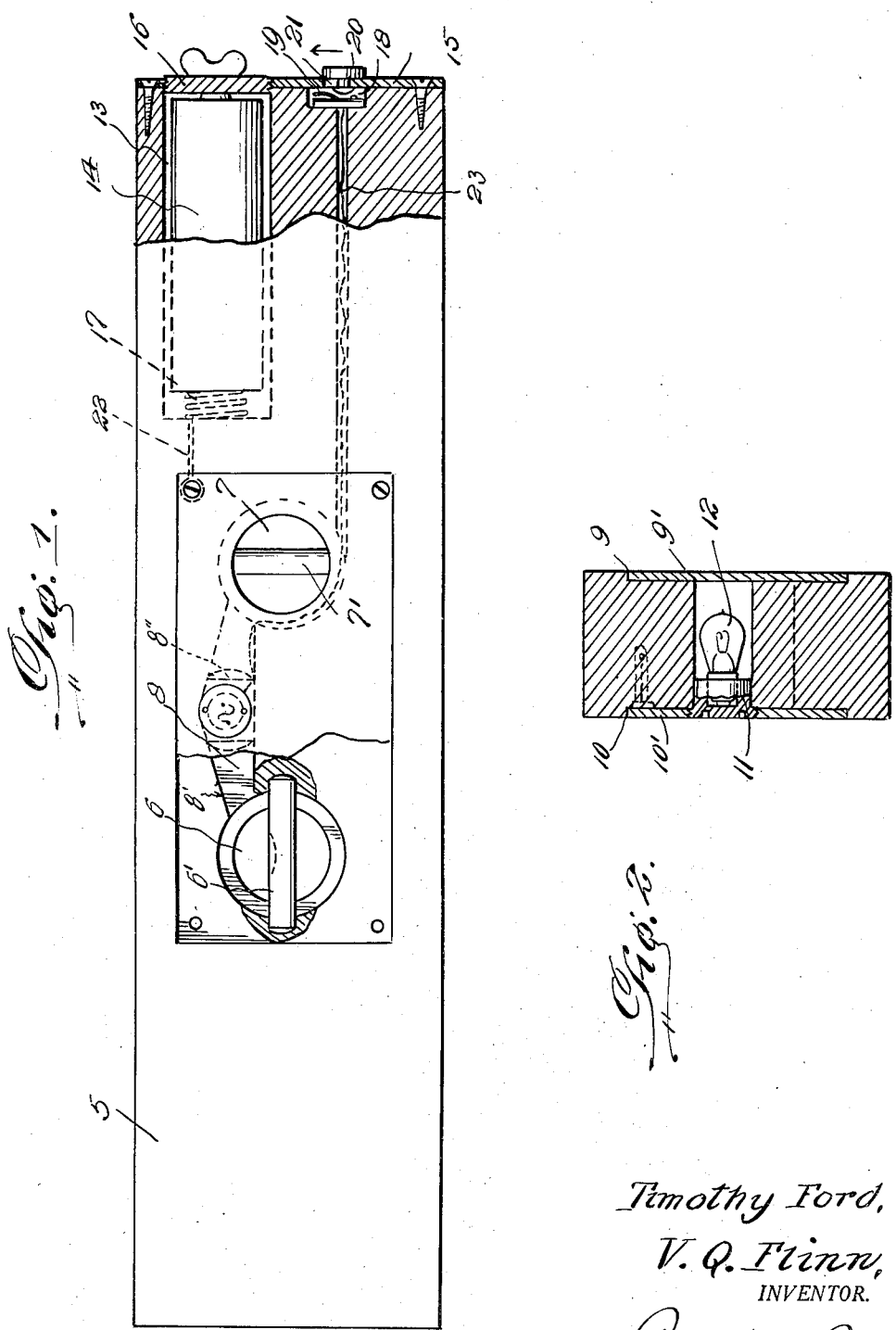
Timothy Ford,
V. Q. Flinn,
INVENTOR.
BY
ATTORNEYS.

Patented Mar. 10, 1925.

1,529,475

UNITED STATES PATENT OFFICE.

TIMOTHY FORD AND VAN Q. FLINN, OF LEXINGTON, KENTUCKY.

ILLUMINATING MEANS FOR LIQUID LEVELS.

Application filed February 7, 1924. Serial No. 691,246.

*To all whom it may concern:*

Be it known that we, TIMOTHY FORD and VAN Q. FLINN, citizens of the United States, residing at Lexington, in the county of Fayette and State of Kentucky, have invented certain new and useful Improvements in Illuminating Means for Liquid Levels, of which the following is a specification.

This invention relates generally to the art of liquid levels and has more particular reference to an illuminating means therefor whereby the indicating element per se of the level may be readily viewed at all times, the primary object of the invention residing in the provision of a liquid level wherein said illuminating means which comprises an electric lamp, as well as its source of electric supply, which includes an ordinary dry cell battery is contained within the level structure.

An additional object of the present invention resides in the provision of but a single illuminating means for both the vertical and horizontal level indicating members per se, and wherein the illuminating means per se, as well as its source of supply may be removed at will for renewal or other purposes.

Yet another object is to provide an illuminating means for liquid levels wherein the circuit between the before mentioned electric lamp and said source of supply may be completed by an extremely simple form of switch whenever it is necessary to illuminate either of said horizontal or vertical level indicating members.

With the above and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout both of the views, Figure 1 is an elevational view partly in cross section, constructed in accordance with the present invention and Figure 2 is a detail transverse cross sectional view, taken through a certain portion thereof.

Now having particular reference to the drawing, 5 indicates the usual liquid level board formed intermediate its ends with a pair of circular shaped openings 6 and 7, traversing which are the usual longitudinal and vertical liquid level indicating elements per se, designated respectively, 6' and 7'. These circular-shaped openings 6 and 7 of the level board 5 are in communication with each other through a passageway 8 obviously formed in said board.

The level board 5 is formed upon its opposite side with mortices 9 and 10 for the reception of metal plates 9' and 10' for affording cover plates for said communicating passageway 8 and also for the connected ends of the level indicating members 6' and 7', it being however, obvious that these plates 9' and 10' are formed with openings adjacent their opposite ends for allowing said level indicating members to be readily viewed. The outer wall surface 8' of the passageway 8 is arched, from end to end, as indicated in Figure 1 of the drawing.

Detachably associated with the metal plate 10' is an electric lamp socket 11 that engages within the center point of the passageway 8 when said cover plate is positioned this electric lamp socket member 11 being obviously adapted for the reception of an electric lamp 12 that becomes disposed within said passageway 8 when the plate 10' is positioned within the mortice 10 of the level board 5. Within the passage 8 at opposite sides of the lamp 12 are bull's eye lenses 8'' for obviously magnifying the light rays from the lamp. The lamp 12 is located at a point midway between the ends of the arched wall surface 8' of the passage 8.

Formed in one end of the level board 5 is a storage battery receiving pocket 13 that opens at the end of said board and within which is to be disposed a desirable form of dry cell battery 14. Upon this end of the level board 5 there is secured a metal plate 15 that is formed with a screw-threaded opening in registration with the battery receiving pocket 13 and within which is to be screwed a closure plug 16 that not only serves to maintain the battery 14 within the pocket but causes the same to maintain firm contact with an expansible spring 17 disposed within the lower end of said pocket 13.

Disposed in a relatively small pocket or depression 18 at the before-mentioned end of the level board 5 is the spring contact 19 of a circuit closing switch, the other contact embodying a movable button 20 that is disposed for lateral sliding movement within a slot 21 of said board and plate 15.

The before mentioned expansible spring 17 which engages the lower contact of the battery 14 is electrically connected as at 22 to the lamp socket carrying plate 10' while the stationary contact 19 of the before mentioned switch is electrically connected to one contact of said socket 11 through the medium of a wire 23 that passes through a channel in the board 5 for this purpose.

The closure plug 16 engages with the upper contact of the battery 14 and is electrically connected to the button 20 of the switch through the end plate 15 and it will at once be obvious that by moving this button 20 in the direction of the arrow in Figure 1, the circuit will be completed to the electric lamp 12 and the level indicating elements 6' and 7' consequently illuminated in order that the same may be readily viewed. By reason of the detailed arrangement of the lamp bulb 12—12 with relation to the arched surface 8' of the passage, the said surface serves as a reflector for directing the rays of light from a single bulb toward the central portions of both of the openings 6 and 7. Therefore, when the bulb is illuminated, either of the tubes in the openings may be readily observed. For this reason, the level may be conveniently used for accurately determining or ascertaining conditions at inaccessible places.

Numerous advantages of an illuminating means for liquid levels of this character will be at once appreciated by those skilled in the art, and even though we have herein set forth the most practical embodiment of the invention with which we are at this time familiar, it is nevertheless to be understood that minor changes may be made in the invention without departing from the spirit and scope of the appended claim.

Having thus described our invention, what we claim as new and desire to secure by Letters Patent is:—

A level comprising a block having spaced openings passing transversely therethrough and located at equal distances from the side edges of the block, a bubble tube disposed transversely across each opening, one of the tubes being disposed longitudinally of the block and the other transversely thereof, a block having a passageway which communicates with both of said openings, the ends of the passageway being located at points to one side of the median longitudinal dimension of the block, and the said passageway having an outer arched wall surface, the end portions of which are disposed toward the opening and the intermediate portions of the bubble tube and a lamp bulb located in the passageway, at a point midway between the ends of the arched wall surface thereof.

In testimony whereof we affix our signatures.

TIMOTHY FORD.
VAN Q. FLINN.